(12) United States Patent  
Hirata et al.

(10) Patent No.: US 10,221,018 B2  
(45) Date of Patent: Mar. 5, 2019

(54) SCREW CONVEYOR

(71) Applicant: FUJI CORPORATION, Chiryu-shi (JP)

(72) Inventors: Shuichi Hirata, Toyota (JP); Shigefumi Suzuyama, Toyota (JP); Jun Yanagisaki, Toyota (JP); Osamu Nagai, Nagoya (JP)

(73) Assignee: FUJI CORPORATION, Chiryu-shi (JP)

( * ) Notice: Subject to any disclaimer, the term of this patent is extended or adjusted under 35 U.S.C. 154(b) by 0 days.

(21) Appl. No.: 15/764,042

(22) PCT Filed: Sep. 30, 2015

(86) PCT No.: PCT/JP2015/077702  
§ 371 (c)(1),  
(2) Date: Mar. 28, 2018

(87) PCT Pub. No.: WO2017/056223  
PCT Pub. Date: Apr. 6, 2017

(65) Prior Publication Data  
US 2018/0201448 A1    Jul. 19, 2018

(51) Int. Cl.  
*B65G 33/14* (2006.01)  
*B65G 33/00* (2006.01)  
(Continued)

(52) U.S. Cl.  
CPC .............. *B65G 33/24* (2013.01); *B23Q 11/00* (2013.01); *B23Q 11/0057* (2013.01);  
(Continued)

(58) Field of Classification Search  
None  
See application file for complete search history.

(56) References Cited

U.S. PATENT DOCUMENTS 6,068,108 A    5/2000 Dudley  
6,357,576 B1 *  3/2002 Enonnoto .......... B01D 21/2455  
                                                   198/495  
(Continued)

FOREIGN PATENT DOCUMENTS

JP    63-11259 A    1/1988  
JP    9-174376 A    7/1997  
(Continued)

OTHER PUBLICATIONS

International Search Report dated Nov. 17, 2015 in PCT/JP2015/077702 filed Sep. 30, 2015.

*Primary Examiner* — Kavel Singh  
(74) *Attorney, Agent, or Firm* — Oblon, McClelland, Maier & Neustadt, L.L.P.

(57) ABSTRACT

A screw conveyor that appropriately discharges chips inside cutting fluid includes: a main body in the form of a container provided with a storage tank; a screw rotatably assembled inside the storage tank; a discharge pipe formed at a rear side of the main body and connected to the storage tank; an inlet section configured to receive the chips and the cutting fluid into the storage tank at a front side; a guide plate configured to guide the chips and the cutting fluid to the screw; a screw cover provided with multiple fine holes configured to cover a space above the screw; and an opening formed in the storage tank at a position higher than the screw cover such that the cutting fluid enters inside the main body.

4 Claims, 5 Drawing Sheets

(51) Int. Cl.
    *B65G 65/46*           (2006.01)
    *B23Q 11/00*          (2006.01)
    *B65G 33/24*          (2006.01)
    *B23Q 11/10*          (2006.01)

(52) U.S. Cl.
    CPC ............. *B65G 33/14* (2013.01); *B65G 65/46* (2013.01); *B23Q 11/1069* (2013.01); *B65G 2201/04* (2013.01)

(56) References Cited

U.S. PATENT DOCUMENTS

| | | | |
|---|---|---|---|
| 6,601,691 B1* | 8/2003 | Enomoto | B23Q 11/0057 198/495 |
| 7,681,715 B2* | 3/2010 | McMorris | A01K 5/0258 198/657 |
| 2017/0368654 A1* | 12/2017 | Kochl | B23Q 11/0057 |

FOREIGN PATENT DOCUMENTS

| | | |
|---|---|---|
| JP | 2006-305647 A | 11/2006 |
| JP | 2010-284753 A | 12/2010 |

\* cited by examiner

SCREW CONVEYOR

TECHNICAL FIELD

The present invention relates to a screw conveyor for discharging cutting fluid and chips together to the outside of a machine.

BACKGROUND ART

In machine tools such as lathes and machining centers, since chips are generated during processing, a discharge conveyor for discharging the chips from the processing section to outside of the machine tool is provided. With a discharge conveyor, a storage tank provided with an inlet for receiving chips and cutting fluid is provided below the processing section. Inside the conveyor, chips are conveyed rearwards and are collected by falling into a collection box from a discharge pipe that extends diagonally up. There are various types of such a discharge conveyor, including a drum type conveyor and a chip conveyor that uses an endless hinge belt. Among these, screw conveyors are desirable due their small dimension in the height direction. A conventional screw conveyor is disclosed in patent literature 1 below.

This screw conveyor has a screw rotatably assembled inside a tubular storage tank that includes an inlet on a top section, and an opening covered by perforated metal is formed on a top side of the storage tank for collecting cutting fluid. In the machine tool, chips generated during processing fall into the conveyor from the inlet open in the top direction, and are collected in the storage tank together with the cutting fluid. The chips are conveyed to the rear by rotation of the screw, are pushed along the discharge pipe, and are discharged to the outside to be collected. On the other hand, for the cutting fluid that has collected in the storage tank, the level of the fluid gradually rises until the fluid is discharged from the opening to the tank of the conveyor main body, and is then sent to a coolant device by a pump, such that a portion or all of the fluid can be reused or discarded.

CITATION LIST

Patent Literature

Patent literature 1: JP-A-2006-305647

SUMMARY OF INVENTION

Technical Problem

However, with a conventional screw conveyor, for example, when processing aluminum work, the chips get stuck in the perforated metal that covers the opening for the cutting fluid. Because aluminum is relatively light, thin chips with a small volume are easily caused to float up due to the pressure of the fluid from below that results from the screw stirring the cutting fluid that has collected in the storage tank. Therefore, chips float on the surface of the fluid, flow to the opening together with the cutting fluid, and cause the blockage.

The present invention takes account of such problems, and an object thereof is to provide a screw conveyor configured to appropriately discharge chips in cutting fluid.

Solution to Problem

A screw conveyor of an embodiment of the present invention includes: a main body in the form of a container provided with a storage tank configured to collect chips and cutting fluid; a screw rotatably assembled inside the storage tank; a discharge pipe formed at a rear side of the main body and connected to the storage tank; an inlet section configured to receive the chips and the cutting fluid into the storage tank at a front side opposite to the discharge pipe; a guide plate configured to guide the chips and the cutting fluid to the screw, the guide plate being provided to the rear of the inlet section; a screw cover provided with multiple fine holes configured to cover a space above the screw, the screw cover being provided to the rear of the guide plate; and an opening formed in the storage tank at a position higher than the screw cover such that the cutting fluid enters inside the main body.

Advantageous Effects

According to the present invention, by providing a guide plate and a screw cover to prevent chips floating, it is possible to collect chips in a portion of the screw while in the cutting fluid, such that even chips from work such as aluminum are appropriately discharged outside the machine by the screw.

DESCRIPTION OF EMBODIMENTS

Figure 1:
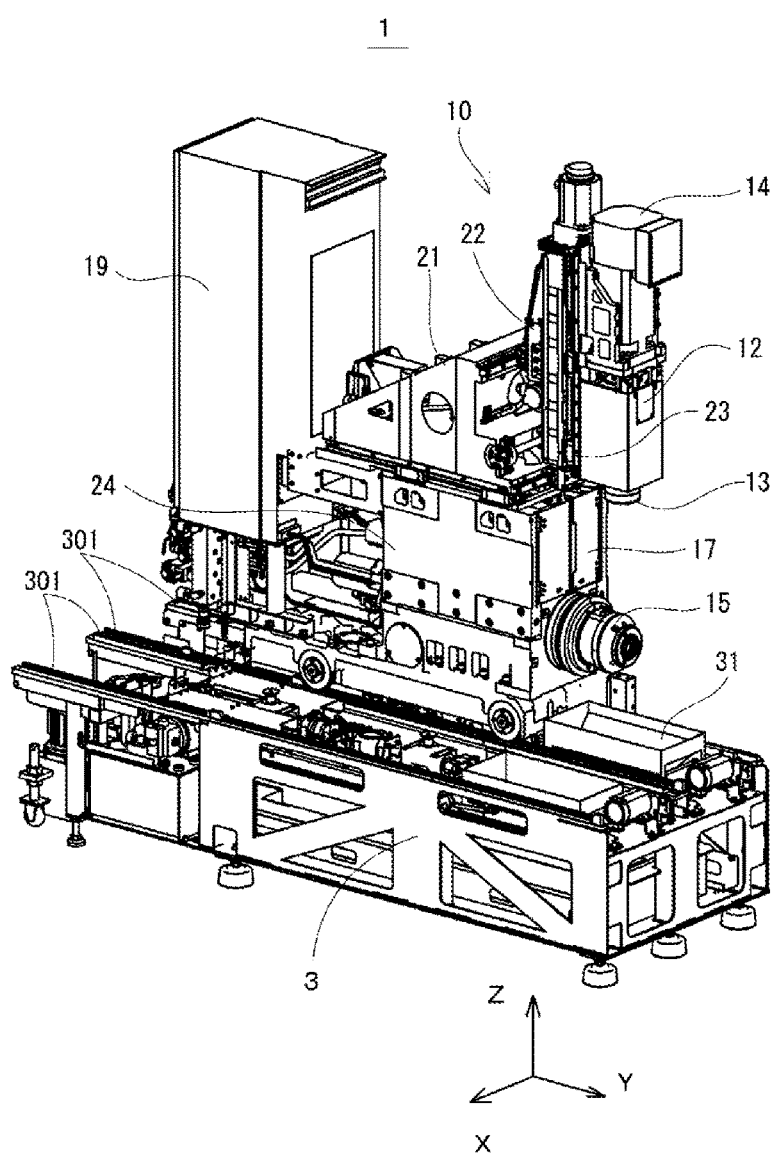
FIG. 1 is a perspective view of the main configuration of a machining center.

Hereinafter, an embodiment of a screw conveyor according to the invention will be described with reference to the drawings. In this embodiment, an example is given of a screw conveyor assembled in a machining center. First, a basic description is given of the configuration of the machining center. FIG. 1 is a perspective view of the main configuration of a machining center. Machine center 1 is provided with processing module 10 loaded on base 3 so as to be movable in the front-rear direction (Y-axis direction), with a closed processing chamber being formed inside by covering the module with machine covers.

Main axis head that holds a tool is provided in a front section of processing module 10. Main axis head 12 includes main axis chuck 13 to which tools such as drills, reamers, and boring tools are removably attached, and main axis motor 14 is provided for rotating the tool attached to main axis chuck 13. Chuck device 15 for gripping work in a rotatable manner is arranged below main axis head 12. Tool magazine 17 that stores multiple tools is provided between chuck device 15 and main axis head 12, such that tool exchange can be performed at main axis chuck in accordance with the processing to be performed.

Machining center 1 is designed to have a small machine width. Thus, the drive mechanisms for moving main axis head 12 is the X-axis, Y-axis, and Z-axis directions are provided in a front-rear direction of the machine body, and control box 19 for performing drive control of each of the driving sections is loaded even further to the rear. Y-axis slider 21 is loaded on an upper section of tool magazine 17 so as to be freely movable in the front-rear direction, and X-axis slider 22 is loaded on Y-axis slider 21 to be freely movable in the width direction (X-axis direction). Further, Z-axis slider 23 is loaded on the X-axis slider so as to be freely movable in the vertical direction (Z-axis direction), and main axis head 12 is loaded on Z-axis slider 23.

Y-axis slider 21, X-axis slider 22, and Z-axis slider 23 are each slidably engaged with guide rails and guide blocks so as to be freely slidable in their respective directions. Each drive mechanism has a screw shaft connected to a rotating shaft of a servo motor, the screw shaft being engaged with a nut fixed to each of the sliders. Accordingly, by performing drive control of each servo motor, rotation is converted into linear motion, such that Y-axis slider 21, X-axis slider 22, and Z-axis slider 23 are moved in their respective directions by specified amounts. By this, the tool held by main axis head 12 is moved, such that specified processing is performed by the tool held by main axis head 12 with respect to work gripped by chuck device 15.

Figure 3:
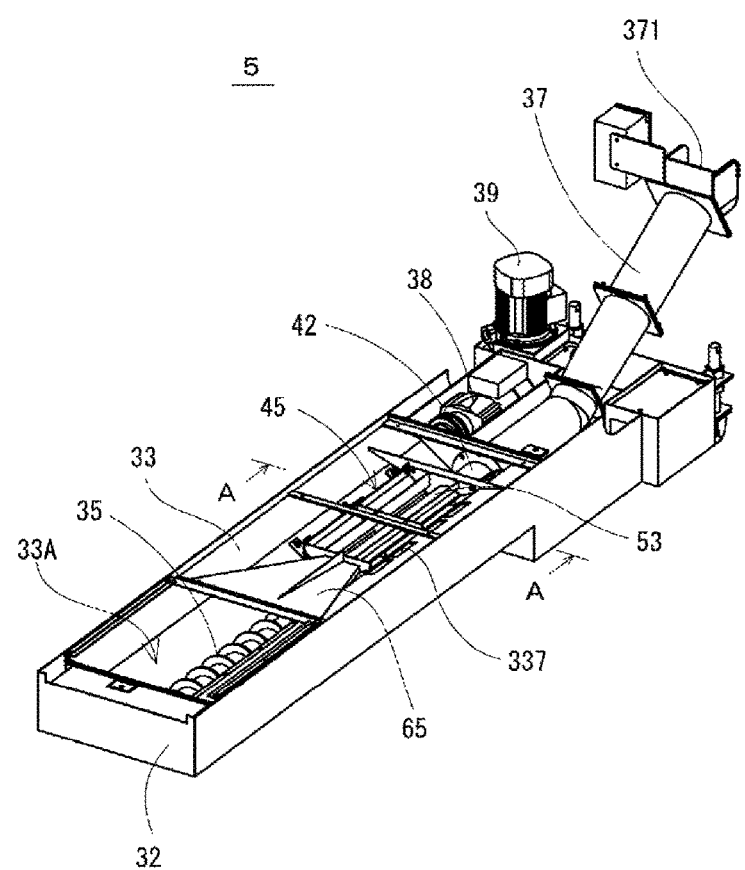
FIG. 3 is a perspective view of an embodiment of a screw conveyor.

Chips from the work generated by processing such as shaving are carried away by cutting fluid and collected by screw conveyor 5 provided inside base 3 as shown in FIG. 3. As shown in FIG. 1, base 3 is provided with four rails 301, two sets each, such that two processing modules 10 can be loaded. Thus, two screw conveyors 5 are provided inside base 3 in accordance with the width between two rails. With screw conveyor 5, inlet 31, which is a wide opening below chuck device 15, is formed in a front section of base 3. Thus, chips cut from the work and cutting fluid that carries the chips away are collected inside screw conveyor 5 via inlet 31.

Figure 2:
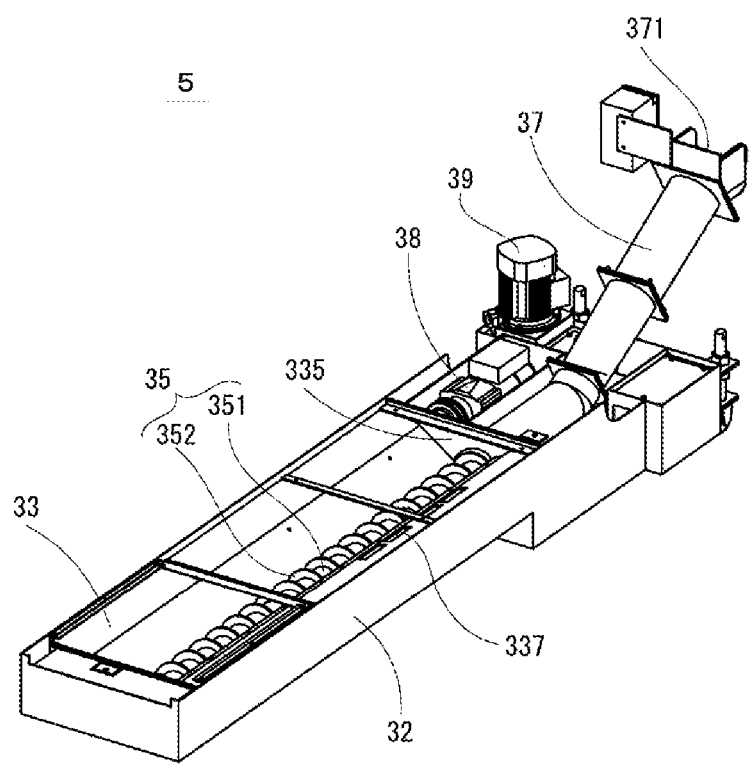
FIG. 2 is a perspective view of an internal configuration of an embodiment of a screw conveyor.
Figure 4:
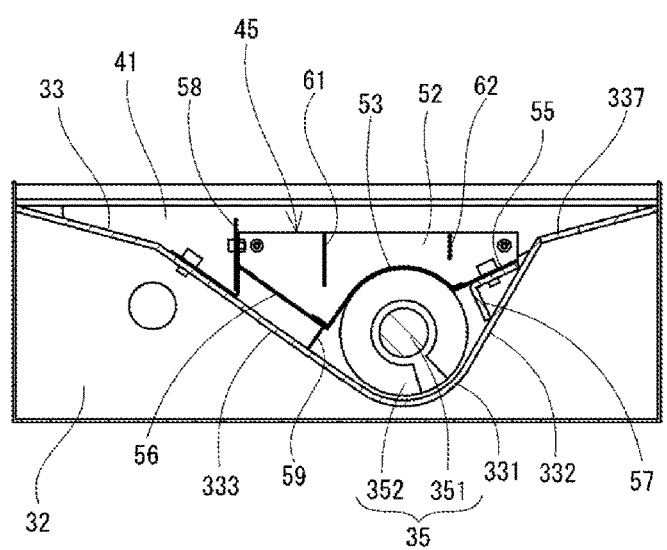
FIG. 4 is a cross section of the screw conveyor at line A-A of FIG. 2.

A perspective view of screw conveyor 5 of the present embodiment is shown in FIGS. 2 and 3, with some portions omitted in FIG. 2 for ease of understanding the internal configuration. Also, FIG. 4 is a cross section of the screw conveyor at line A-A of FIG. 3. Screw conveyor 5 is configured with storage tank 33 formed to contain screw 35 being engaged inside a box-shaped main body that is open at the top. Storage tank 33 is formed as a container that slopes diagonally from both sides such that a central portion in the width direction is lower than outer portions.

Storage tank 33 is a formed from curved lower section 331, sloping sections 332 and 333 formed to extend in both directions in the width direction, and upright end sections 335 at both ends in the lengthwise direction, creating a container capable of collecting cutting fluid. Screw 35 is formed as one body with helical blade 352 connected to rotating shaft 351. With screw 35 arranged inside storage tank 33, rotating shaft 351 pierces end sections 335 of storage tank 33, so as to be rotatably supported by shaft holders on the outside of storage tank 33. At the front side of main body 32 as shown in the near side of the figure, the portion at which rotating axis 351 pierces end section 335 at the front side of main body 32 is sealed by a sealant member.

On the other hand, at the rear side of main body 32, discharge pipe 37 connected to the inside of storage tank 33 is formed. In other words, screw 35 is configured to pierce an opening at rear end section 335 and extend to discharge pipe 37, such that chips are moved from storage tank 33 to discharge pipe 37. Thus, rotating axis 351 of screw 35 is configured so as to further pierce discharge pipe 37 via the sealant member, and be rotatably supported on the outside, with rotation of drive motor 38 being transmitted to rotating axis 351 via a reduction device. Discharge pipe 37 is formed to rise towards the rear, with outlet 371 being formed on an upper end of discharge pipe 37.

Storage tank 33 capable of storing chips and cutting fluid is long in the front-rear direction, and inlet 31 shown in FIG. 1 is formed in inlet section 33A of a front portion. Therefore, chips entering via inlet 31 are moved to discharge pipe 37 at the rear from inlet section 33A inside storage tank 33 by the rotation of screw 35. Similarly, cutting fluid that has entered storage tank 33 from inlet 31 collects inside storage tank 33 due to the slope of discharge pipe 37.

On storage tank 33, four openings 337 are formed at the same height on one of sloping sections 332. Openings 337 are formed at a position higher than the uppermost point of helical blade 352 such that the entire screw 35 is immersed in cutting fluid. Opening 337 is connected to the inside of main body 32, such that cutting fluid that flows from storage tank 33 through opening 337 is collected inside main body 32. Therefore, main body 32 is a tank for cutting fluid, with collected cutting fluid being reused by being passed through a filter or the like, so as to be able to be re-supplied to the processing section of machining center 1 via pump 39.

However, as mentioned above, there is a problem in that with work made from a relatively light material such as aluminum, the chips tend to float on the cutting fluid. It is possible to move chips that have sunk to the bottom section of storage tank 33 rearwards efficiently by rotating screw 35, but it is difficult to move chips that float to the surface and are pushed around by screw 35. Further, floating chips are carried away to opening 337 together with the cutting fluid. Because opening 337 is covered by perforated metal with fine holes, particles and the like are stopped and prevented from entering main body 32. However, this also means that opening 337 becomes blocked, such that frequent cleaning to remove chips is required. Also, the blockage of opening 337 may cause cutting fluid containing chips to overflow from storage tank 33.

Figure 5:
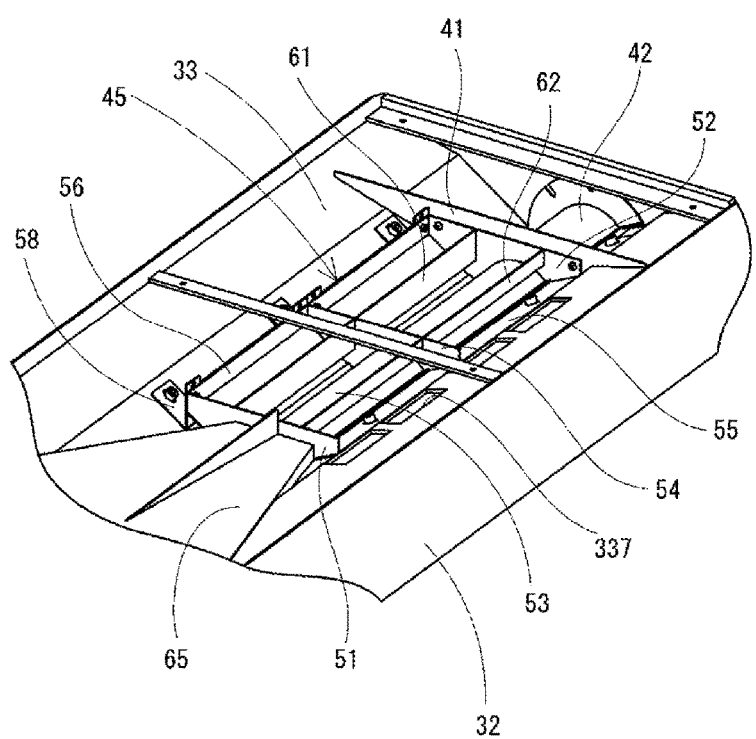
FIG. 5 is a perspective view of configuration members of the chip collection section of the screw conveyor.

Thus, with the present invention, a configuration is used in which chips are prevented from floating, so that chips are appropriately discharged from storage tank 33 by screw 35. Specifically, as shown in FIG. 3, with respect to storage tank 33 of a type shown in FIG. 2, a configuration is added for collecting chips at the rear side of inlet section 33A. FIG. 5 is an enlarged perspective view of configuration members of such a chip collection section. FIG. 4 is a cross section of configuration members of this chip collection section.

First, dividing plate 41 is formed at a rear end of storage tank 33 to block cutting fluid. A cutout is formed in dividing plate 41 to allow screw 35 to pierce through, and rear pipe 42 that connects to discharge pipe 37 is connected to the cutout. Thus, chips and cutting fluid inside storage tank 33 are moved from the cutout of dividing plate 41 to discharge pipe 37 along rear pipe 42.

Cover unit 45 is assembled on a front side of dividing plate 41. Cover unit 45 is formed from curved screw cover 53 that covers screw 35 connected to pair of end plates 51 and 52 that are arranged in the front-rear direction. Screw cover 53 is formed from perforated metal with many fine holes with a diameter of, for example, around 1 mm, such that cutting fluid can pass through but chips cannot pass through. Screw cover 53 is arranged without contacting helical blade 352 of screw 35, but with an extremely fine gap separating screw cover 53 and helical blade 352. Thus, chips do not get caught between screw cover 53 and helical blade 352, and even if chips enter the fine holes of screw cover 53, those chips are dislodged by the rotating helical blade 352.

Connecting plates 55 and 56 are connected to both ends in the width direction of screw cover 53. Further, screw cover 53 and connecting plates 55 and 56 are formed such that the ends in the lengthwise direction meet with and are connected to end plates 51 and 52. Connecting plate 55 positioned on the opening 337 side is flat and narrow, and dividing plate 57 with an L-shaped cross section is screwed to the underside of connecting plate 55. As shown in FIG. 4, one surface of dividing plate 57 is screwed to connecting plate 55, and the end of the other surface of dividing plate 55 contacts sloping section 332. Therefore, storage tank 33 in which screw 35 is positioned is divided into a bottom section 331 side and an opening 337 side.

Connecting plate 56 on the opposite side to connecting plate 55 is formed from a surface that runs along sloping section 333 of storage tank 33 and a surface that stands upright. Fixing bracket 58 is screwed to the upright surface of connecting plate 56, and fixing bracket 58 is further screwed to sloping section 333 of storage tank 33. The upright surface forms a blocking wall in the width direction, such that cutting fluid flowing in the cover unit 45 portion flows to opening 337. Also, narrow and flat dividing plate 59 is connected to the lower surface of connecting plate 56 at the end of connecting plate 56 towards screw 35. A lower end of dividing plate 59 meets sloping section 333, such that bottom section 331 of storage tank 33 in which screw 35 is positioned is divided.

Intermediate plate 54 is provided at a central portion in the lengthwise direction of cover unit 45. Intermediate plate 54 is formed to match the shape of screw cover 53 and connecting plates 55 and 56, and divides an upper section of cover unit 45 into two in the lengthwise direction. Further, sheet plates 61 and 62 are connected in the lengthwise direction so as to join end plates 51 and 52 and intermediate plate 54. Upper side sheet plates 61 and 62, which are flat and narrow plates, are attached in an upright state, and are formed such that the lower end of sheet plate 61 that is further from opening 337 is lower than the uppermost point of screw cover 53, and the lower end of sheet plate 62 that is closer to opening 337 is higher than the uppermost point of screw cover 53. Sheet plates 61 and 62 are for ensuring that items floating on the surface of the fluid in the cover unit 45 portion do not flow to opening 337. However, to make it easier for cutting fluid to flow to opening 37, the height dimensions of sheet plates 61 and 62 are different.

With cover unit 45, chips must be collected at a portion of screw 35 covered by screw cover 53. Therefore, chips that have entered storage tank 33 from inlet section 33A must progress to the cutout section formed in end plate 51 through which screw 35 pierces. So that chips do not flow to the cutout on the bottom sect ion 331 side if the surface level of the cutting fluid is high, with the present embodiment, guide plate 65 is provided between inlet section 33A and cover unit 45. Guide plate 65 is attached to contact sloping sections 332 and 333 to cover storage tank 33 from above. Also, the cross section in the lengthwise direction of the portion surrounded by storage tank 33 and guide plate 65 is funnel shaped, going from inlet section 33A at the front to the rear.

Continuing, chips are moved by screw conveyor 5 of the present embodiment in the following manner. First, shaving processing or the like is performed on work in machining center 1, chips from the work generated by the processing are carried away by cutting fluid, and are collected inside storage tank 33 of screw conveyor 5 via inlet 31 that is open in base 3. Chips inside storage tank 33 are moved rearwards towards discharge pipe 37 by rotating screw 35. With discharge pipe 37, chips consecutively moved by screw 35 accumulate, are pushed up from below so as to rise, fall from outlet 371, and are collected in a collection box located below.

Here, because chips are compressed as they are pushed inside discharge pipe 37, cutting fluid adhering to chips falls from the chips as if they are being squeezed, so as to flow to storage tank 33. Therefore, the amount of cutting fluid inside storage tank 33 increases, until screw 35 is immersed and chips float. With respect to this point, in the present embodiment, chips collect at the bottom section 331 side due to guide plate 65 and cover unit 45. That is, flow to the rear is created by rotating screw 35, and chips caught in the flow progress along a funnel-shaped flow path towards bottom section 331 due to guide plate 65. Then, chips are pushed by the rotating screw 35 so as to pass end plate 51 and enter cover unit 45.

Inside cover unit 45, bottom section 331 of storage tank 33 is surrounded by screw cover 53 and dividing plates 57 and 59, such that chips collect in the screw 35 portion. On the other hand, because cutting fluid passes through the fine holes of screw cover 53 formed from perforated metal, the height of the cutting fluid exceeds the height of screw 35. Thus, even light chips are kept in a state below the surface of the fluid without floating to the top thanks to screw cover 53, and are moved to the rear side by rotation of screw 35.

The cutting fluid of the cover unit 45 portion flows down into main body 32 via opening 337. The fine holes in screw cover 53 do not allow chips to flow through, but do allow particles finer than chips to flow through. Such particles float on the surface of the cutting fluid, but their flow to opening 337 is stopped near the fluid surface by sheet plates 61 and 62. Because cutting fluid flows to opening 337 under sheet plates 61 and 62, particles and the like floating near the surface of the fluid remain inside cover unit 45 of storage tank 33.

Therefore, according to screw conveyor 5 of the present embodiment, by providing cover unit 45 and guide plate 65 to prevent chips from floating up, chips can be collected in the screw 35 portion even within the cutting fluid. Therefore, even chips of work made from aluminum are appropriately discharged to the outside by screw 35 and collected. Also, the flow of chips inside main body 32 that forms the tank for cutting fluid is prevented, such that operation problems and damage to the pump caused by chips can be prevented. Further, because cover unit 45 is formed from one assembly, it is easy to assemble to storage tank 33.

With screw conveyor 5, opening 337 is provided with respect to cover unit 45. Therefore, cutting fluid flows from inside screw cover 53 towards opening 337, and chips easily collect at the position of screw 35. In particular, guide plate 65 forms a funnel-shaped flow path towards bottom section 331, such that chips flow to screw 35 efficiently. Further, bottom section 331 of storage tank 33 in which screw 35 is positioned is surrounded by dividing plates 57 and 59, and end plates 51 and 52 of cover unit 45, such that chips are enclosed, meaning that chips are effectively moved by screw 35 without be spread around. Also, sheet plates 61 and 62 are provided in cover unit 45 to divide the surface of the fluid in the width direction of storage tank 33, such that particles and the like also do not flow easily to opening 337.

To achieve the above effects, screw conveyor 5 may be used in a machine tool that processes aluminum works. Also, because screw conveyor 5 enables a compact design with a small height dimension, screw conveyor 5 may also be provided inside a low base 3 such as that of the machine tool of the present embodiment.

The above describes an embodiment of the present invention, but embodiments are not limited to these and various changes may be employed without departing from the scope of the disclosure. For example, with an embodiment above, screw 35 is covered by cover unit 45, but a simple configuration may be used in which only a curved screw cover made from perforated metal is fixed to sloping sections 332 and 333 of storage tank 33.

REFERENCE SIGNS LIST

1: machining center; 3: base; 5: screw conveyor; 10: processing module; 15: chuck device; 31: inlet; 32: main body; 33: storage tank; 33A: inlet section; 35: screw; 37: discharge pipe; 45: cover unit; 53: screw cover; 61, 62: sheet plate; 65: guide plate; 337: opening

The invention claimed is:

1. A screw conveyor comprising:
a main body in the form of a container provided with a storage tank configured to collect chips and cutting fluid;
a screw rotatably assembled inside the storage tank;
a discharge pipe formed at a rear side of the main body and connected to the storage tank;
an inlet section configured to receive the chips and the cutting fluid into the storage tank at a front side of the main body opposite to the discharge pipe;
a guide plate configured to guide the chips and the cutting fluid to the screw, the guide plate being provided to the rear of the inlet section in a conveying direction of the screw;
a cover unit including a screw cover and a first end plate, the screw cover including multiple fine holes configured to cover a space above the screw, the first end plate provided to the rear of the guide plate in the conveying direction of the screw, the first end plate including a curved bottom surface connected to an upstream end of the screw cover and; and
an opening formed in the storage tank at a position higher than the screw cover such that the cutting fluid enters inside the main body.

2. The screw conveyor according to claim 1, wherein
the cover unit includes a second end plate at a rear end of the screw cover in the conveying direction of the screw so as to surround the screw.

3. The screw conveyor according to claim 2, wherein
the screw cover has a circular shape to match a shape of the screw, the first end plate connected to the front end and the second end plate connected to the rear of the screw cover, and
the cover unit includes a dividing plate provided at both sides in a width direction of the screw cover so as to surround the screw from both sides.

4. The screw conveyor according to claim 1, wherein
a sheeting plate extending in a front-rear direction of the main body is provided above the screw cover and between a space above a rotation axis of the screw and the opening.

* * * * *